United States Patent [19]

Katoh

[11] E Patent Number: Re. 33,558

[45] Reissued Date of Patent: Mar. 26, 1991

[54] ELECTRONIC MUSICAL INSTRUMENT FORMING TONE WAVEFORMS

[75] Inventor: Mitsumi Katoh, Hamamatsu, Japan

[73] Assignee: Yamaha Corporation, Hamamatsu, Japan

[21] Appl. No.: 63,809

[22] Filed: Jun. 24, 1987

Related U.S. Patent Documents

Reissue of:

[64] Patent No.: 4,409,876
Issued: Oct. 18, 1983
Appl. No.: 323,464
Filed: Nov. 20, 1981

U.S. Applications:

[63] Continuation of Ser. No. 786,640, Oct. 11, 1985, abandoned.

[30] Foreign Application Priority Data

Dec. 1, 1980 [JP] Japan ..... 55-167965

[51] Int. Cl.[5] ..... G10H 7/00

[52] U.S. Cl. ..... 84/605; 341/24; 341/26

[58] Field of Search ..... 84/1.01, 1.03, 1.28; 340/365 S, 365 E; 341/20, 22, 24–26

[56] References Cited

U.S. PATENT DOCUMENTS 3,743,755 7/1973 Watson ..... 84/1.01
4,228,403 10/1980 Okumura et al. .

*Primary Examiner*—S. J. Witkowski
*Attorney, Agent, or Firm*—Spensley Horn Jubas & Lubitz

[57] ABSTRACT

A frequency number corresponding to the frequency of a tone intended to be sounded is accumulated in an accumulator at every calculation timing of a constant interval to produce values progressing at a rate corresponding to the tone frequency. At this rate, waveform amplitude value samples are sequentially produced one after another in a tone producing section using the output of the accumulator as phase angle data. A reset circuit is provided in connection with the accumulator and this circuit functions to compulsorily reset the progressing values in the accumulator to its initial value in response to a carry out signal generated at the calculation timing when the phase angle data has reached its predetermined modulo value. Thus the period of progress of the phase angle data is harmonized with the calculation timing, i.e., the sampling timing. As a result, the frequency of a tone waveform signal, whatever it may be, can be harmonized with the sampling frequency while the interval of the respective sampling timing is maintained constant.

17 Claims, 6 Drawing Sheets

ELECTRONIC MUSICAL INSTRUMENT FORMING TONE WAVEFORMS

Matter enclosed in heavy brackets [ ] appears in the original patent but forms no part of this reissue specification; matter printed in italics indicates the additions made by reissue.

*This is a continuation of reissue application Ser. No. 786,640, filed Oct. 11, 1985, now abandoned.*

BACKGROUND OF THE INVENTION

This invention relates to an electronic musical instrument constructing tone waveforms by sequentially aligning wave samples in which a sampling frequency is harmonized with the tone frequency.

In an electronic musical instrument of a digital processing type, a tone waveform is formed by sequentially aligning amplitude samples of a tone waveform at a constant sampling interval. The following two systems have heretofore been practiced as the musical tone forming system by sampling (aligning samples): One is to perform sampling with a constant sampling frequency regardless of the frequency of a tone to be formed and the other is to have the sampling frequency synchronized with the frequency of the tone to be formed. In the former system the ratio between the tone frequency and the sampling frequency is generally noninteger and therefor an aliasing noise which is not harmonized with the tone frequency is produced as will be apparent from the sampling theory. For this reason, this system requires a device for reducing the aliasing noise and the musical instrument as a whole becomes larger. On the other hand, this system has the advantage that a time sharing operation can be realized owing to the constant sampling frequency, i.e., a single system of the apparatus can be used on a time shared basis for sampling a plurality of tone waveforms of different pitches and the device for forming tones thereby can be economized. In the latter system, the tone frequency is harmonized with the sampling frequency and, accordingly, frequency-related components are also harmonized with the tone frequency and no aliasing noise is produced. The latter system therefore has the advantage that no particular device is necessary for reducing the aliasing noise. Since, however, different sampling frequencies must be used for tones of different pitches, the latter system is incapable of forming tones by the time sharing operation. The latter system therefore requires parallel provision of a plurality of tone forming system in the same number as a maximum number of tones to be produced simultaneously and this necessitates an apparatus of a large scale.

SUMMARY OF THE INVENTION

It is, therefore, an object of the present invention to provide an electronic musical instrument in which the aliasing noise is removed by harmonizing the tone frequency with the sampling frequency and simultaneously forming of a plurality of tones on a time shared basis can be realized. This object can be achieved by an electronical musical instrument which comprises a phase angle data generator for generating a phase angle data signal which exhibits a value timewisely progressing, at every predetermined sampling timing of a constant interval, from a first value to a second value, at a rate corresponding to the frequency of a tone intended to be sounded and a reset circuit for resetting the progressing value of the phase angle data signal to the first value at every sampling timing when the data reaches the second value, a tone waveform of the tone to be sounded being sampled by this phase angle data. The value of the phase angle data progresses at a constant rate excepting at a resetting sampling timing. Accordingly, the value of the phase angle data repeatedly progresses from the first value to the second value, one cycle being an interval of time from resetting to next resetting. Since the resetting is made in synchronization with a certain sampling timing, the repeating cycle of the phase angle data is synchronized with the sampling timing. In other words, ratio of the repeating frequency of the phase angle data and the sampling frequency is an integer ratio. As a result, the frequency of a tone formed by sampling corresponding to the phase angle data is harmonized with the sampling frequency and the aliasing noise thereby in removed. Besides, since the interval of the sampling timings is constant irrespective of the frequency of a tone to be formed, a plurality of tones can be formed simultaneously on a time shared basis. A condition for readily carrying out the simultaneous forming of a plurality of tones on a time shared basis is that a repeating frequency of each individual time division channel timing is constant, i.e., the interval of sampling timing of the time shared channels is constant. The present invention in which the interval of the sampling timing can be made constant irrespective of the frequency of the tone to be formed can satisfy this condition. In the foregoing manner, both removal of the aliasing noise and simultaneous forming of plural tones on a time shared basis can be achieved with a relatively simple construction, thereby contributing to more compact design of the instrument and saving of manufacturing cost.

At a sampling timing at which the phase angle data is compulsorily reset, the rate of progressing of the phase angle data is different from the rate at other sampling timings. This difference occurs because the phase angle data which would have reached a different phase value is compulsorily reset to a predetermined phase value corresponding to the first value. For this reason, there is produced a difference in the progression rate of the phase at the particular sampling timing resulting in difference in the tone frequency and distortion of the tone waveform. This adverse effect, however, can be alleviated to such a degree as will not practically cause a problem by increasing the sampling frequency.

It is another object of the invention to provide a device which can increase the sampling frequency even in a case where the electronic musical instrument employs a tone producing device in which a high speed operation is difficult. This object is achieved by converting a phase angle data signal generated in synchronism with a high speed sampling timing to a phase angle data signal of a low speed sampling timing, producing tone waveform amplitude data based on the low speed phase angle data signal and reconverting this tone waveform amplitude data to data of a high speed sampling timing. The phase angle data signal generated at the high speed sampling timing is periodically reset in synchronism with the sampling timing as was previously described, the repeating frequency of the phase angle data being harmonized with the high speed sampling frequency. The tone waveform amplitude data is resampled at every sampling timing at which the phase angle data signal harmonized with the high speed sampling frequency progresses to a predetermined phase state and the frequency of a tone established by this tone waveform amplitude data thereby is accurately harmonized with the sampling frequency.

BRIEF DESCRIPTION OF THE DRAWINGS

In the accompanying drawings.

PREFERRED EMBODIMENTS OF THE INVENTION

Figure 1:
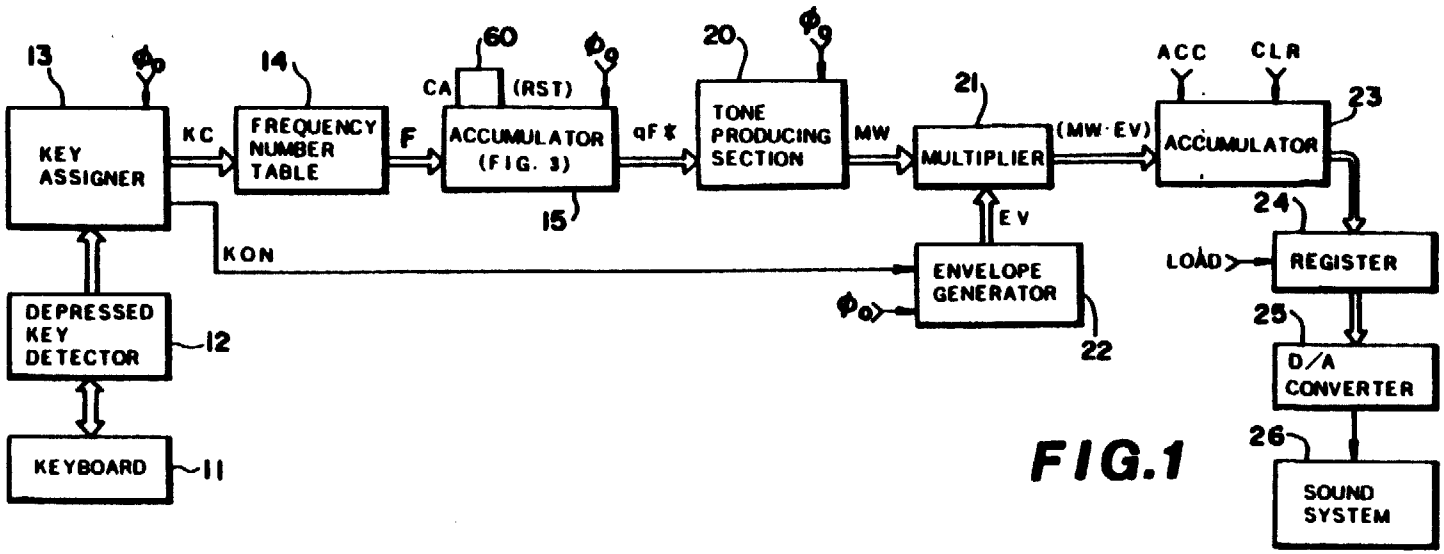
FIG. 1 is a block diagram showing an entire construction of an embodiment of the electronic musical instrument made according to the invention.
Figure 2:
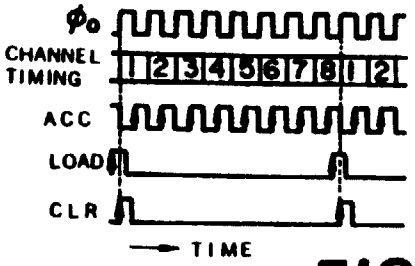
FIG. 2 is a time chart showing time division channel timings and various control signals in FIG. 1.

Referring first to FIG. 1, a depressed key detector 12 detects a key or keys being depressed in keyboard 11 and supplies for each of the keys being depressed data representing the depressed key to a key assigner 13. The key assigner 13 assigns sounding of tone of the depressed key to one of tone generation channels and outputs, responsive to the timing of the particular channel and on a time shared basis, a key code KC of plural bits representing the key having been assigned to the particular channel and a key-on signal KON of one bit representing whether the key is still being depressed or has been released. The time division timings of the respective channels are formed in synchronism with a system clock pulse $\phi_0$. Relationship between the system clock pulse $\phi_0$ and time division *order or* timings of respective channels is shown in FIG. 2. In this example, the eight channels are employed.

The key code KC outputted from the key assigner 13 is applied to a frequency number table 14. The frequency number table 14 prestores constants proportionate to tone frequencies of respective keys, i.e., constants corresponding to phase progress per unit time (hereinafter referred to as "frequency number"). The frequency number table 14 provides a frequency number F corresponding to the key code KC which is applied thereto as an address signal. Accordingly, frequency numbers F for the depressed keys having been assigned to the respective channels are read from the table 14 on a time shared basis. These frequency numbers F are applied to an accumulator 15.

The accumulator 15 repeatedly calculates the frequency number F of the same channel at a regular time interval (either addition or subtraction, assuming that addition is made in the example to be described below) and outputs, for each of the channels, phase angle data qF* as a result of the calculation. The reference character q denotes an integer representing the number of the repetition which changes like 1, 2, 3 . . . with lapse of the regular calculation time. The accumulator 15 is of a certain modulo (e.g. M) corresponding to a phase angle $2\pi$ so that the phase angle data qF* repeats the change up to this modulo number M which constitute a maximum value.

When, generally speaking, an accumulated value (qF) of an accumulator of modulo M has exceeded the modulo number M, i.e., the result of calculation has overflown, the value left in the accumulator is a valve obtained by subtracting the modulo number M from the accumulated value (qF), i.e., a value qF which is of a less significant digit than the modulo number M. In a next calculation timing, the frequency number F is added to this left-over value (qF) which is fractional value short of F. As a result, the repeating frequency of the accumulated value (qF) becomes equal to the frequency represented by the frequency number F. On the other hand, the repeating frequency of the accumulated value (qF) becomes irrelevant (unharmonic) to the repeating frequency of the regular calculation timing (i.e., sampling frequency). Accordingly, the repeating frequency of the phase angle data qF* obtained by the accumulator 15 in FIG. 1 is generally equal to the frequency represented by the frequency number F and is not harmonized with the sampling frequency. According to the present invention, however, the repeating frequency of the phase angle data qF* actually obtained is harmonized with the sampling frequency by employing an arrangement according to which a value left over when the result of the calculation has overflown is compulsorily reset. To this end, an arrangement is made so as to apply a carry out signal CA of the accumulator 15 to a reset input (RST) of the accumulator 15 through a line 60. The carry out signal CA is a signal generated when the result of the calculation of the accumulator 15 has overflown.

Figure 3:
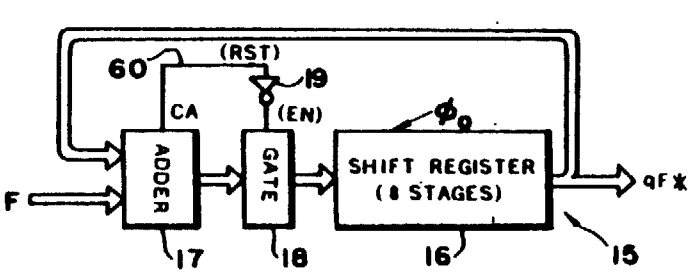
FIG. 3 is a block diagram showing an example of an accumulator for generating phase angle data in FIG. 1.

An example of the accumulator 15 is shown in FIG. 3. The accumulator shown in FIG. 3 includes a shift register 16 and an adder 17 and cumulatively adds, for each channel, the frequency number F on a time shared basis. The shift register 16 has eight stages corresponding to the number of channels and is shift controlled by the system clock pulse $\phi_0$. This shift register 16 memorizes the accumulated result, i.e., the phase angle data qF*, for each channel. The data qF* for the respective channels is outputted from the final stage on a time shared basis. The output qF* of the shift register 16 is fed back to one input of the adder 17. The adder 17 receives at another input thereof the frequency number F read from the frequency number table 14 on a time shared basis. The channel timing of a preceding result of accumulation of the phase angle data qF* and that of the frequency number F applied to the adder 17 are in synchronism with each other so that the frequency number F of the same channel is repeatedly added. Time interval of this repeated addition is one cycle of the time division channel timings, i.e., eight cycles of the system clock pulse $\phi_0$.

The output of the adder 17 is applied to the shift register 16 through a gate 18. To an enable input (EN) of the gate 18 is applied a signal obtained by inverting the carry out signal CA of the adder by an inverter 19. The carry out signal CA is normally "0" so that the gate 18 is enabled by the output signal "1" of the inverter 19 and the output of the adder 17 is applied to the shift register 16 through the gate 18. Upon overflowing of the result of addition in the adder 17 at a certain channel timing, the carry out signal CA is turned to "1" and the gate 18 is disabled by the output signal "0" of the inverter 19. At this time, fractions left by the overflowing are outputted from the adder 17 but this output is inhibited by the gate 18 and not applied to the shift register 16. In this manner, the result of the accumulated value, i.e., the phase angle data qF* is cleared in the carry out signal CA (i.e., reset to phase 0).

By this arrangement, a timing at which the phase angle data qF* returns to the phase 0 is accurately synchronized with the timing of the system clock pulse $\phi_0$. Since the repeating period of the phase angle data qF* (a period from the phase 0 to a next phase 0) is an integer multiple of the system clock pulse $\phi_1$, the frequencies of the phase angle data qF* and the system clock pulses $\phi_0$ are harmonized with each other.

The phase angle data qF* of each channel outputted from the accumulator 15 on a time shared basis is applied to the tone producing section 20. The tone producing section 20 produces tone waveform sample point amplitude data MW *on a time shared basis* in response to the phase angle data qF*. The tone producing section 20 is composed, e.g., of a tone waveform memory prestoring a tone waveform and tone waveform sample point amplitude data corresponding to a phase angle represented by the phase angle data qF* is read from the tone waveform memory. The tone producing section 20 is not limited to a tone waveform memory but may be any construction so long as it is capable of producing a tone signal whose frequency is determined by the progressing phase angle data qF*. *It will be appreciated that the tone generation system generates tones in a time shared manner with respect to other tones including non-harmonically related tones.*

The tone waveform sample point amplitude data MW for each channel outputted from the tone producing section 20 is applied to a multiplier 21 where it is multiplied with envelope shape data EV provided by an envelope generator 22. The envelope generator 22 produces, on a time shared basis, the envelope shape data EV for each channel which realizes tone sounding characteristics such as attack, sustain and decay in response to the key-on signal KON of each channel. In the multiplier 21, the tone waveform sample point amplitude data MW and the envelope shape data EV of the same channel are multiplied with each other. The tone waveform sample point amplitude data (MW.EV) having been controlled in envelope and outputted from the multiplier 21 is applied to an accumulator 23. The accumulator 23 is a circuit for summing the tone waveform sample point amplitude data for the respective channels in one sample period (eight channel times) into one combined sample, and is entirely different from the previously described accumulator 15. This accumulator 23 receives an addition timing signal ACC and a clear signal CLR which are generated in the manner shown in FIG. 2. The addition timing signal ACC is repeatedly generated at a second half of the time division time slots for the respective channels. The tone waveform sample point amplitude data for the respective channels provided from the multiplier 21 are successively accumulated at the timing of this signal ACC.

The output of the accumulator 23 is applied to a register 24. The register 24 receives also a load signal LOAD which rises, as shown in FIG. 2, after rising of the signal ACC at the second half of the time slot of the channel 8. Accordingly, upon accumulation of the tone waveform sample point amplitude data for all of the channels 1–8 by the accumulator 23, the register 24 is charged to a load mode by the load signal LOAD and the output of the accumulator 23, i.e., the sum of the tone waveform sample point amplitude data for all of the channels 1–8 during one sample period, is loaded to the register 24. At the beginning of the time slot for the channel 1 following immediately thereafter, the clear signal CLR builds up to clear the constants of the accumulator 23.

The sum of the tone waveform sample point amplitude data for all the channels held in the register 24 is converted to an analog signal by a digital-to-analog converter 25 and thereafter supplied to a sound system 26.

Figure 4:
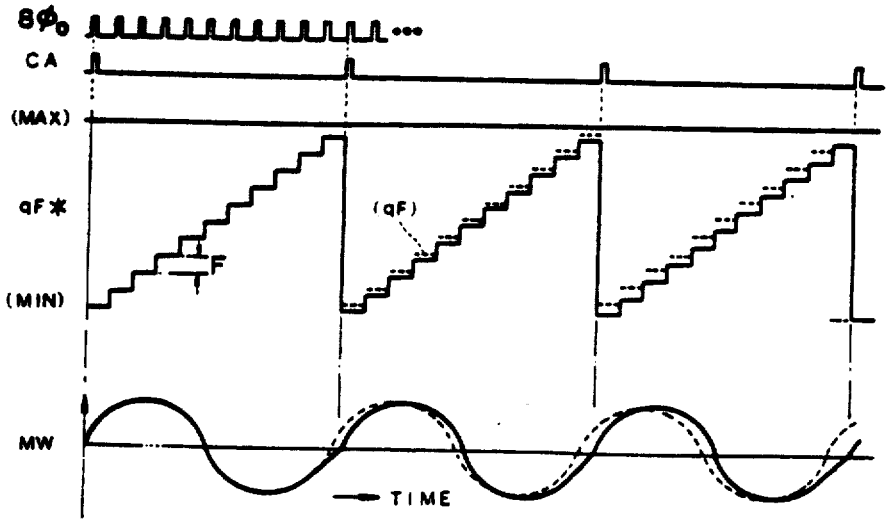
FIG. 4 is a time chart for illustrating the operation of the accumulator shown in FIG. 3.

An example of the phase angle data qF* outputted from the accumulator 15 is shown in FIG. 4 with respect to a single channel. Although the waves appear intermittently they are depicted continuous for sake of simplicity. In FIG. 4, 8 $\phi_0$ denotes a calculation timing of the frequency number F for a single channel and has a period of eight times as long as that of the system clock pulse $\phi_0$. CA in FIG. 4 denotes a timing at which the carry out signal CA is produced from the accumulator 15. As the frequency number F is cumulatively added one after another at each calculation timing 8 $\phi_0$, the phase angle data qF* increases at a rate corresponding to the value of F. When the added value of the phase angle data qF* in the adder 17 has exceeded the maximum value MAX of the adder 17, the carry out signal CA is generated. Since the data qF* of the corresponding channel of the accumulator 15 (i.e. in the shift register 16 is immediately reset by this carry out signal CA, the data qF* is reduced to the minimum value MIN (corresponding to the predetermined phase, e.g., phase 0). This MIN may preferably be set as zero. Alternatively stated, the fractions (the residue value as is minus F) which were to be left as the phase angle data qF* in the accumulator 15 when the phase angle data qF* overflow are discarded and this data qF* is reset compulsorily to the minimum value MIN (i.e., 0). Accordingly, the phase angle data qF* starts increasing always from the same value (e.g., the minimum value MIN). As a result, the value of the phase angle data qF* (i.e., phase angle) successively obtained in synchronism with the calculation timing 8$\phi_0$ in one cycle of the repeating cycle of the phase angle data qF* remains the same in any cycle. The synchronization of the repeating timing of the same phase value with the calculation timing 8 $\phi_0$ means that ratio of the repeating frequency of the phase angle data qF*, i.e., frequency of a tone signal generated in response to this data qF*, to the frequency of the calculation timing 8 $\phi_0$, i.e., the sampling frequency, is an integer, i.e. . . . , the two frequencies are harmonized with each other.

In the space of the phase angle data qF* of FIG. 4, phase angle data (qF) which is not reset by the carry out signal CA is indicated by a broken line in contrast with the phase angle data qF* indicated by a solid line. As will be apparent from comparison of the two data, the phase angle data qF* which is reset by the carry out signal CA has a slightly longer repeating period than the phase angle data (qF) which is not reset. This is because the phase angle data (qF) which is not reset always changes progresses at a constant rate corresponding to the frequency number F whereas the phase angle data qF* which is reset changes at a constant rate corresponding to the frequency number F at calculation timings at which the carry out signal CA is not produced but not at a constant rate at a calculation timing at which the carry out signal CA is produced, for, at this calculation timing, a smaller value than the frequency number F is actually added due to discarding of fractions.

The repeating frequency of the phase angle data (qF) which is not reset corresponds to a regular (normal) tone frequency designated by the frequency number F, whereas the repeating frequency of the phase angle data qF* provided according to the present invention is slightly deviated from the regular tone frequency. The phase angle data qF* increases at a constant regular rate at calculation timings at which the carry out signal CA is not produced and at a smaller rate at the calculation timing at which the carry out signal CA is produced (i.e., a smaller value than F is added). Accordingly, the phase progress rate becomes slower at the sampling timing at which the carry out signal CA is produced than at other sampling timings and the waveform therefore is distorted to that extent. For illustrating this point, an example of the tone signal (tone waveform sample point amplitude data) MW produced by the tone producing section 20 in response to the phase angle data qF* is shown by a solid line in FIG. 4. This is a tone waveform which is read out when the tone producing section 20 is composed of a sinusoid memory. The tone signal MW actually is a stepped amplitude variation with the sampling timing being taken as a unit, but FIG. 4 illustrates a smoothed amplitude variation for ready understanding of the distortion in the waveform.

As will be apparent from FIG. 4, delay in the phase progress takes place in the tone signal MW at the sampling timing at which the phase angle data qF* is compulsorily reset to the phase 0 by the carry out signal CA and this causes the slight distortion in the waveform. For the sake of comparison, a distortionless sine wave signal obtained in accordance with the phase angle data qF) of a constant rate is shown by a broken line in the space designated as MW in FIG. 4.

It should be noted that FIG. 4 depicts the distortion in the waveform in a somewhat exaggerated from for ready understanding of the features of the phase angle data qF* and the tone waveform MW provided by the present invention and that the difference in frequency and the distortion in the waveform can be held at a degree which has practically no adverse effect. The frequency difference and the waveform distortion in the waveform are produced by discarding fractions (i.e. value short of the frequency number F left in the calculator 15 at the timing of generation of the carry out signal CA) and, accordingly, magnitudes of the frequency difference and the waveform distortion become greater as this discarded value increases. Accordingly, the discarded value at the timing of generation of the carry out signal CA should be as small as possible. For this purpose, the frequency of the system clock pulse $\phi_0$ should be set at the highest possible value to shorten the sampling period (i.e., calculation timing 8 $\phi_0$) and, in accordance therewith, the frequency number F should be held at the minimum possible value.

In the above described embodiment, the contents of the accumulator 15 are reset to the minimum value MIN when the contents have overflown (i.e., have exceeded the maximum value MAX). The construction of the accumulator 15, however, is not limited to this but an arrangement may be made so that the fact that the contents of the accumulator 15 have exceeded a predetermined value is detected and, responsive to this detection, the accumulator 15 is reset to a value corresponding to a predetermined phase. Alternatively, the accumulator 15 may be reset to a preset value which is slightly larger than the minimum value MIN (but not greater than the frequency number F) when the contents of the accumulator 15 have overflown.

As has been previously described, the frequency of the system clock pulse $\phi_0$ is required to be as high as possible for holding the frequency difference and waveform distortion at a minimum. This requires a higher rate of time division channel timings and the tone producing section must be of a high speed operation type. A high speed operation is feasible in a construction by which the tone waveform amplitude data is simply read from a tone waveform memory but such high speed operation is difficult depending upon a tone producing system employed in the time producing section 20. For example, such high speed operation will be difficult in case a tone is to be produced by frequency modulation calculation. If a tone producing system is employed in which a high speed operation is not possible, channel timing speed high/low converters 28 and 29 which convert the rate of the time division channel timings to a low rate are provided at the input side of a tone producing section 27 and a channel timing speed low/high converter 30 which converts the rate to a high one is provided at the output signal of the tone producing section 27.

Figure 5:
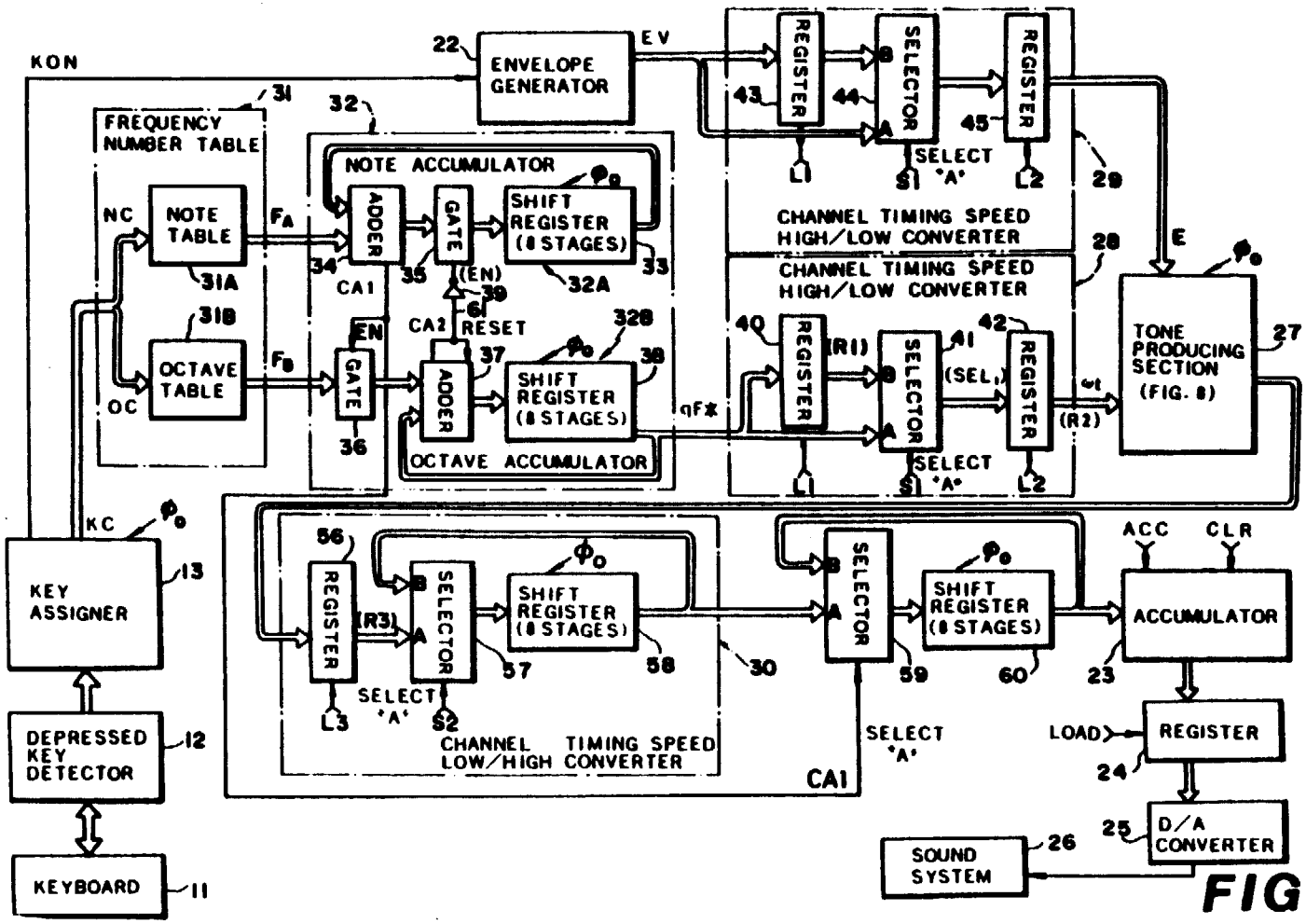
FIG. 5 is a block diagram showing an entire construction of another embodiment of the electronic musical instrument made according to the invention.

In FIG. 5, keyboard 11, depressed key detector 12, key assigner 13, envelope generator 22, accumulator 23, register 24, digital-to-analog converter 25 and sound system 26 perform the same functions as those designated by the same reference numerals in FIG. 1. Constructions of a frequency number table 31 and an accumulator 32 for generating the phase angle data qF* are somewhat different from those (14, 15) in FIG. 1. It is however possible to use the frequency number table 14 and the accumulator 15 shown in FIG. 1 in the circuit of FIG. 5 and, conversely, to use the frequency number table 31 and the accumulator 32 shown in FIG. 5 in the circuit of FIG. 1.

The frequency number table 31 is composed of a note table 31A and an octave table 21B. The note table 31A prestores note frequency numbers F corresponding to twelve note names C, C#, . . . A#, B within one octave. A note code which is a portion representing a note in the key code KC is applied to the note table 31A as an address input and a note frequency number $F_A$ corresponding to the note code NC is read from the note table 31A. The octave table 31B prestores octave frequency numbers $F_B$ representing ratios of frequencies between respective octaves. An octave code OC which is a portion representing an octave in the key code KC is applied to the octave table 31B as an address input and an octave frequency number $F_B$ corresponding to the octave is read from the octave table 31B. By dividing the frequency number table 31 into the note table 31A and the octave table 31B, a required capacity of the memory can be reduced. The memory capacity of the note table 31A is 12 addresses and that of the octave table 31B is addresses corresponding to the number of octaves (i.e. about 4 to 8) totally about 20 addresses. In contrast thereto, the frequency number table 14 in FIG. 1 must store frequency numbers F for all of the keys in the keyboard 11 and therefore requires address of the same number as the number of the keys.

The accumulator 32 includes a note accumulator 32A for accumulating the note frequency numbers $F_A$ and an octave accumulator 32B for accumulating the octave frequency number $F_B$. The note accumulator 32A has 8 stages corresponding to the number of channels and includes a shift register 33 which is shift controlled in synchronism with channel timings by the system clock pulse $\phi_0$, an adder 34 for adding the output of this shift register 33 and the note frequency number $F_A$ together, and a gate 35 for applying the output of the adder 34 to the shift register 33. The note accumulator 32A accumulates the note frequency numbers $F_A$ of the respective channels by the same channel on a time shared basis. Each time the result of addition in the adder 34 has overflown, a carry out signal CA1 is produced.

The carry out signal CA1 of the note accumulator 32A is applied to an enable input (EN) of a gate 36 for the octave accumulator 32B. To the gate 36 is applied the octave frequency number $F_B$. The octave frequency numbers $F_B$ read from the table 31B on a time shared basis at the respective channel timings are gated out of the gate 36 and applied to an adder 37 only when the carry out signal CA1 has been produced by the note accumulator 32A at their channel timings. The octave accumulator 32B includes, besides the gate 36 and the adder 37, a shift register 38 which has 8 stages corresponding to the number of channels and is shift controlled by the system clock pulse $\phi_0$. The output of the adder 37 is applied to the shift register 38 and the output of the shift register 38, in turn, is applied to the other input of the adder 37. Accordingly, the octave frequency number $F_B$ of a certain channel which has been gated out of the gate 36 is added with a preceding result of addition of the same channel.

In the note accumulator 32A, the note frequency number $F_A$ are repeatedly added each time their channel timings have completed one cycle (i.e., every calculation timing 8 $\phi_0$ having an interval of 8 periods of the system clock pulse $\phi_0$). As a result, the carry out signal CA1 is repeatedly generated at a rate corresponding to the magnitude of the note frequency number $F_A$. In the other accumulator 32B, the octave frequency numbers $F_B$ corresponding to the channel at which the carry out signal CA1 has been produced are accumulated each time the carry out signal CA1 has been produced by the note accumulator 32A. Since the octave frequency numbers $F_B$ are values representing the ratio of frequencies between the respective octaves and the carry out signal CA1 is repeatedly generated at a rate corresponding to the note frequency, the contents of the octave accumulator 32B obtained by accumulator the octave frequency numbers $F_B$ each time the carry out signal CA1 has been produced correspond to the tone frequency of the key represented by the key code KC.

When the result of the accumulation in the octave accumulator 32B has exceeded a predetermined modulo, i.e., when the adder 37 has overflown, a carry out signal CA2 is produced. This carry out signal CA2 is equivalent to the carry out signal CA in FIG. 1, representing completion of one cycle of the tone waveform. Both the note accumulator 32A and the octave accumulator 32B are reset by this carry out signal CA2 through a line 61. The resetting of the note accumulator 32A is effected by disabling the gate 35 by a signal "0" obtained by inverting the carry out signal "CA2" by an inverter 39. The resetting of the octave accumulator 32B is generally effected by inhibiting the output of the adder 37 (i.e., by providing a gate similar to the gate 35) but no resetting operation is required in a case where the ratio of modulo of the octave frequency number $F_B$ and that of the adder 37 is made an integer ratio. Since the octave frequency numbers $F_B$ express frequency ratios between the octaves (1, 2, 4, 8, 16), they can all be expressed in integer ratios. Accordingly, the ratios between all of the octave frequency numbers $F_B$ and the modulo of the adder 37 can be made integer ratios. If such integer ratios are realized, an integer multiple of the octave frequency number $F_B$ becomes equal to the modulo of the adder 37 so that the output of the adder 37 becomes "0" when the carry out signal CA2 has been produced. For this reason, resetting of the octave accumulator 32B by the carry out signal CA2 is unnecessary. It is, however, actually not possible to turn the ratios of all of the tone frequency numbers $F_A$ and the modulo of the accumulator 32A into integer ratios and, accordingly, the resetting of the note accumulator 32A by the carry out signal CA2 is necessary.

In the above described manner, the accumulator 32 consisting of the note accumulator 32A and the octave accumulator 32B performs substantially the same operation as the accumulator 15 shown in FIG. 1 outputting phase angle data qF*. In other words, the output of the accumulator 32B is phase angle data qF* which is equivalent to the output of the accumulator 15 in FIG. 1. By the resetting control of the accumulators 32A and 32B by the carry out signal CA2, the repeating frequency of this phase angle data qF* is harmonized with the time division calculation timings, i.e., the sampling frequency.

Figure 6:
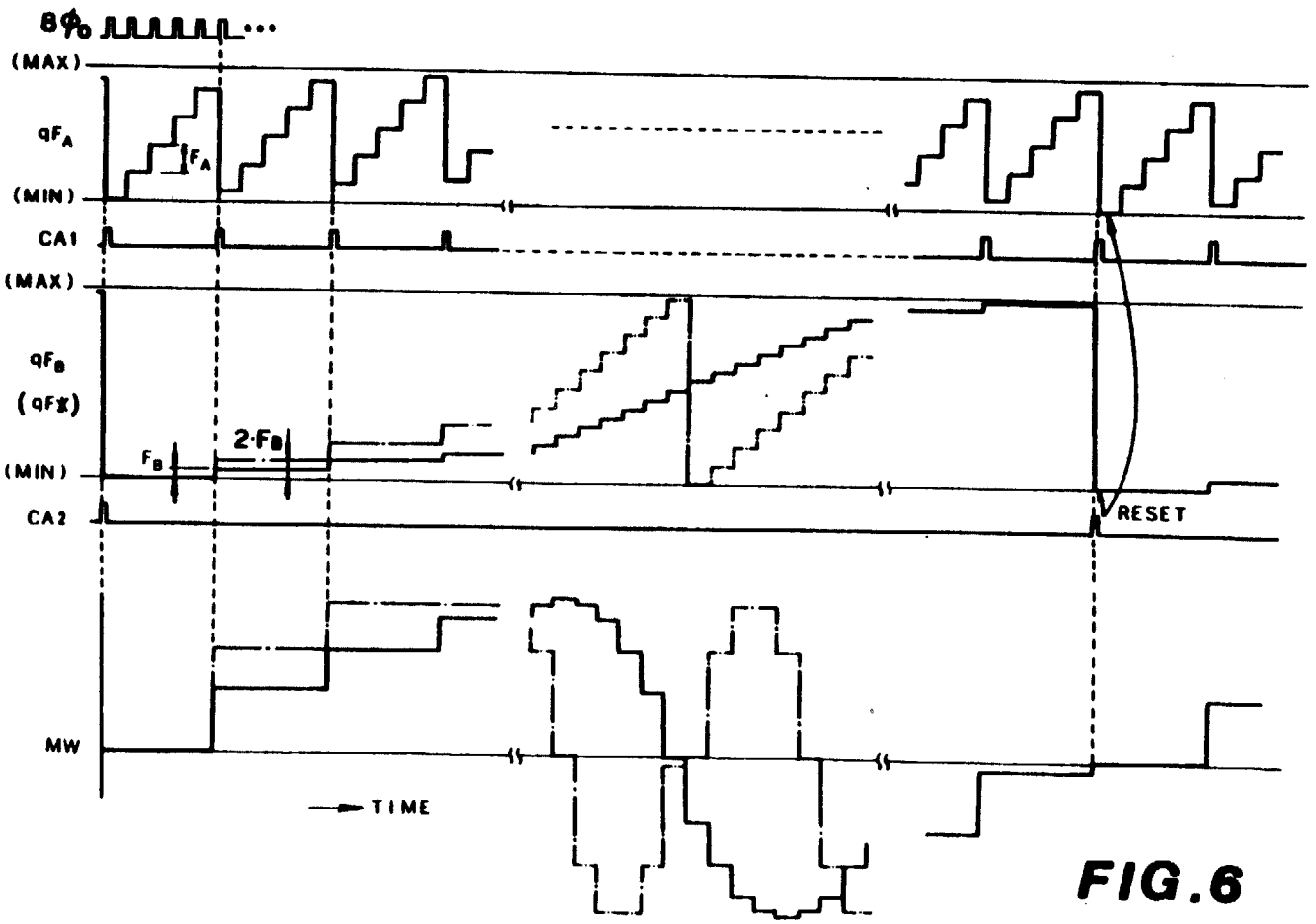
FIG. 6 is a time chart illustrating the operation of an accumulator for generating phase angle data in the embodiment shown in FIG. 5.

An example of a state of the note accumulator 32A with respect to one channel is shown in the space designated $qF_A$ in FIG. 6. In FIG. 6, 8 $\phi_0$ designates, as in FIG. 4, the calculation timing (a period of eight times of the period of system clock pulse $\phi_0$). An example of a state of the octave accumulator 32B is shown in the space designated $qF_B$ (qF*) in FIG. 6. For the convenience of illustration, a part of the time scale is shown in a diminished scale. As will be apparent from the figure, each time the state $qF_A$ of the note accumulator 32A has overflown and the carry out signal CA1 has been produced, the octave frequency number $F_B$ is accumulated in the octave accumulator 32B. Upon generation of the carry out signal CA2 from the accumulator 32B, the accumulators 32A and 32B are reset. In the spaced designated MW in FIG. 6, a sine wave amplitude sampled in accordance with the state of the octave accumulator 32B, i.e., the phase angle data qF*, is illustrated. Chain-and-dot lines in the spaced of $qF_B$ and MW in FIG. 6 show states one octave higher. The value of the octave frequency number $F_B$ one octave higher is double that of the frequency number $F_B$ of the lower octave. Accordingly, the state $qF_B$ of the accumulator 32B shown by the chain-and-dot line increases at a double rate of the state $qF_B$ shown by the solid line. As a result, the sine wave sampled in the manner shown by the chain-and-dot line in the space MW in FIG. 6 is of a frequency which is double that of the sine wave sampled in the manner shown by the solid line, i.e., one octave higher.

In FIG. 5, the phase angle data qF* outputted by the accumulator 32 is applied to a channel timing speed high/low converter 28. This converter 28 is a circuit for converting the time division timings of the phase angle data qF* of the respective channels from a high speed channel timing synchronized with the system clock pulse $\phi_0$ to a low speed channel timing. In this channel timing speed high/low converter 28, a processing is made for converting 8 cycles of the high speed channel timing to 1 cycle of the low speed channel timing. Respective cycles CY1–CY8 of the high speed channel timing corresponding to 1 cycle of the low speed channel timing converting process are illustrated in FIG. 7.

The phase angle data qF* of the respective channels outputted from the accumulator 32 in synchronism with the high speed channel timings 1–8 (FIG. 7) are applied to input (A) of a register 40 and a selector 41. To a load control input of the register 40 is applied a load pulse L1. The load pulse L1 is a signal which, as shown in FIG. 7, rise to "1" respectively at the end of the high speed channel timing 1 in the high speed cycle CY1, at the end of the channel timing 2 in the cycle CY2, at the end of the channel timing 3 in the cycle CY3, at the end of the channel timing 4 in the cycle CY4, at the end of the channel timing 5 in the cycle CY5, at the end of the channel timing 7 in the cycle CY6, and at the end of the channel timing 8 in the cycle CY7. Interval of rising of the load pulse L1 is 10 time slots between the cycles cy5 and CY6 and is 9 time slots in other cycles. The register 40 has the phase angle data qF* loaded therein upon rising of the load pulse L1 to "1". Accordingly, the channel of the phase angle data (qF*) outputted from the register 40 is as shown in the space of (R1) in FIG. 1. This output (R1) of the register 40 is applied to the other input (B) of the selector 41.

Figure 7:
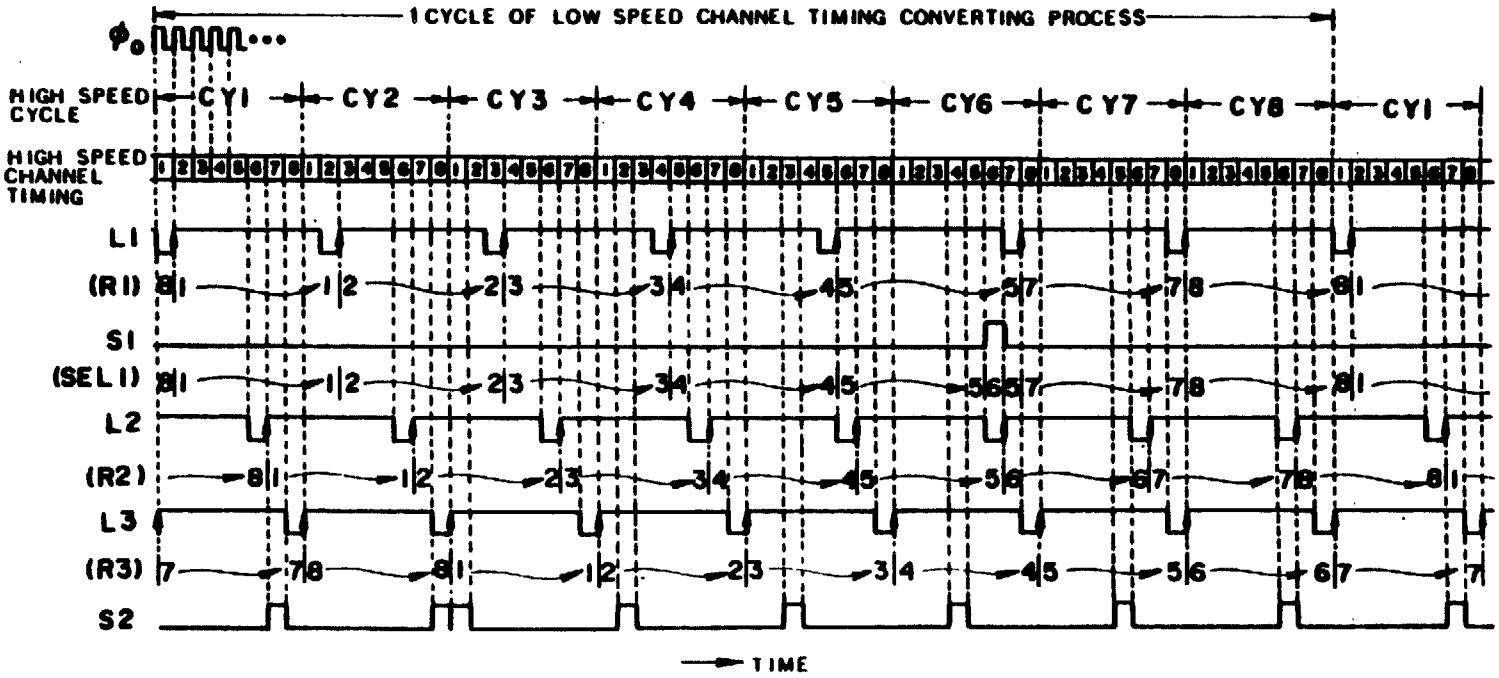
FIG. 7 is a time chart for illustrating a low speed channel timing conversion performed in the same embodiment.

The selector 41 receives, at its selection control input, a select pulse S1 which, as shown in FIG. 7, rises to "1" at the high speed channel timing 6 of the high speed cycle CY6. The selector 41 selects the phase angle data qF* applied to the input (A) when the select pulse S1 is "1" and selects the output (R1) of the register 40 applied to the input (B) when the select pulse S1 is "0". Accordingly, the channel of the phase angle data (qF*) outputted from the selector 41 becomes as shown in the space designated SEL 1 in FIG. 7. The output (SEL 1) of the selector 41 is applied to a register 42. The register 42 receives, at its load control input, a load pulse L2. As shown in FIG. 7, the load pulse L2 is a pulse which rises to "1" at the end of the high speed channel timing 6 in each of the cycles CY1–CY8. The register 42 has the output (SEL 1) of the selector 41 loaded therein when the load pulse L2 has risen to "1". Accordingly, the channel timing 6 in the cycles CY1, CY2, CY3, CY4 and CY5 whereas at the channel timing 6 in the cycle CY6, the phase angle data (qF*) of the channel 6 outputted from the accumulator 32 is loaded in the register 42. At the channel timing 6 in the cycles CY7 and C8, the phase angle data (qF*) of the channel 7 and 8 stored in the register 40 are loaded in the register 42. Accordingly, the channel of the phase angle data (qF*) outputted from the register 42 becomes as shown in the space R2) in FIG. 7.

The output (R2) of the register 42 is applied to a tone producing section 27 as phase angle data ωt which has been changed to a low speed channel timing. Time width of one channel of this low speed channel timing is equal to time width of one cycle of the high speed channel timing as shown in (R2) in FIG. 7.

Another channel timing speed high/low converter 29 is a circuit for converting envelope shape data EV for the respective channels produced on a time shared basis from the envelope generator 22 from a high speed channel timing to a low speed channel timing. The converter 29 includes a register 43, a selector 44 and a register 45 which perform the same functions as the register 40, the selector 41 and the register 42 of the channel timing speed high/low converter 28. The envelope shape data EV of the respective channels applied to this channel timing speed high/low converter 29 are outputted from the register 45 after being changed to a low speed channel timing as shown in (R2) in FIG. 7. The output of the register 45 is supplied to the tone producing section 27 as the envelope shape data E which has been time shared in accordance with the low speed channel timing.

Figure 8:
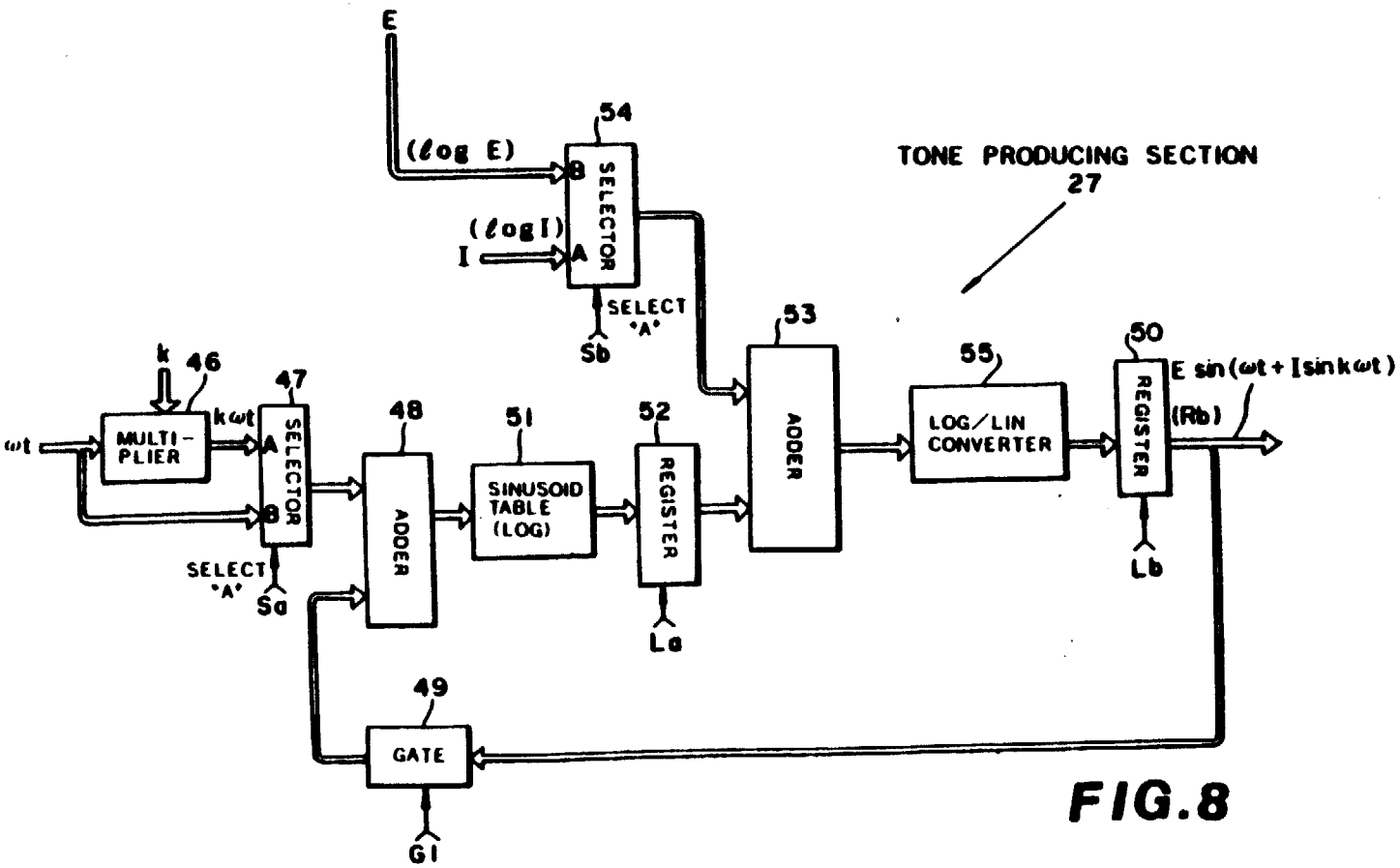
FIG. 8 is a block diagram showing an example of a tone producing section in the same embodiment.

The tone producing section 27 performs frequency modulation calculation on the basis of the phase angle data ωt which has been converted to low speed data and thereby generates tones waveform amplitude, *i.e., wave-shape samples* data. An example of the tone producing section 27 capable of performing the frequency modulation is shown in detail in FIG. 8. In FIG. 8, the following frequency modulation calculation is conducted on a time shared basis by employing a single system of computation circuit:

$$e(t) = E \sin(\omega t + I \sin k\omega t) \quad (1)$$

where e(t) is a tone waveform amplitude obtained by the frequency modulation calculation, E an amplitude coefficient, i.e., envelope shape data, ωt the phase angle of a carrier, I modulation index and kωt the phase angle of a modulating wave. The phase angle data ωt of the carrier corresponds to the phase angle data qF* outputted from the accumulator 32 (FIG. 5) and represents the fundamental frequency of the tone to be produced. k is a selected constant and kωt corresponds to a harmonic frequency of the tone to be produced. According to the above equation (1), many sidebands are produced on both sides of the harmonic frequency (kω) at interval of the fundamental frequency (ω) and levels of these sidebands are controlled by the modulation index I to produced a tone waveform having desired spectrum characteristics. In FIG. 8, calculation of the term of the modulating wave (I sin kωt) is first performed and then a solution of the entire equation is calculated by the computation circuit by utilizing the partial solution with respect to the term of the modulating wave (I sin kωt).

Figure 9:
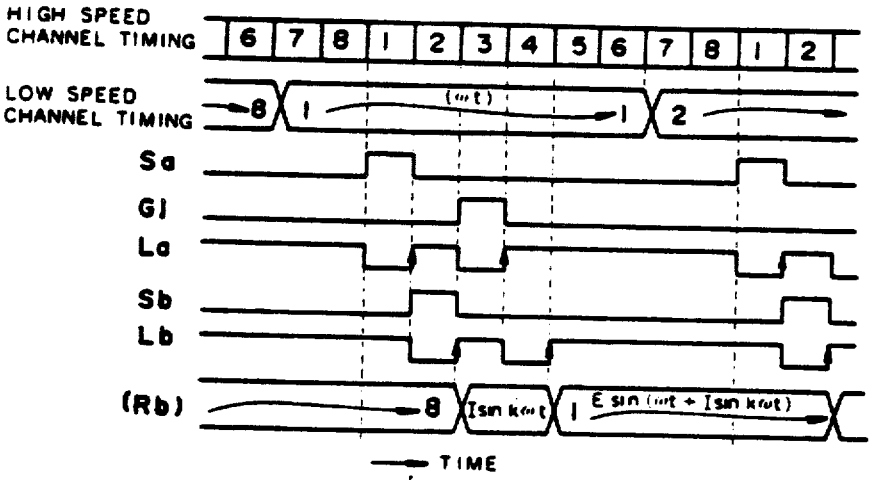
FIG. 9 is a time chart for illustrating the operation of the tone producing section shown in FIG. 8.

In FIG. 8, the phase angle data ωt provided by the register 42 is supplied to a multiplier 46 and an input (B) of a selector 47. This phase angle data ωt maintains the same value during a period of time from the high speed channel timing 7 in a certain high speed cycle to the high speed channel timing 6 in a next high speed cycle, i.e., one low speed channel timing. One low speed channel timing is shown in an enlarged scale in FIG. 9. In the multiplier 46, the numerical value k which represents the order of a harmonic frequency to be used as the modulating wave is multiplied with the phase angle data ωt to produce the phase angle data kωt of the modulating wave. This phase angle data kωt is applied to another input (A) of the selector 47. The selector 47 receives, at its selection control input, a select signal Sa which is turned to "1" in response to the high speed channel timing 1 as shown in FIG. 9. The selector 47 selects the phase angle data kωt of the modulating wave being applied to the input (A) when the select signal Sa is "1" and selects the phase angle data ωt of the carrier being applied to the input (B) when the select signal Sa is "0".

The output of the selector 47 is applied to one input of an adder 48. To another input of the selector 47 is applied the output of a gate 49. A gate signal G1 which is turned to "1" at the high speed channel timing 3 is applied to a control input of the gate 49 and the output of a register 50 is applied to the adder 48 when the gate signal G1 is "1". The output of the adder 48 is applied to a sinusoid table 51. The sinusoid table 51 prestores a sinusoidal function value in a logarithmic form and produces the sinusoidal function value with the output of the adder 48 being used as a phase angle address signal. The output of the sinusoidal table 51 is applied to a register 52. The register 52 receives, at its load control input, a load pulse La which, as shown in FIG. 9, rises to "1" respectively at the end of the high speed channel timing 1 and at the end of the high speed channel timing 3. The register 52 has the output of the sinusoid table 51 loaded therein when the load pulse La has risen to "1".

Accordingly, it is at the end of the high speed channel timing 1 that the register 52 first performs the loading of the output of the sinusoid table 51. Since at this time the selector 47 selects the phase angle data kωt at the input (A) in response to the select signal Sa "1" and the gate signal G1 is "0", data supplied to the adder 48 is 0. Accordingly, the phase angle data kωt is outputted from the adder 48 and the sinusoidal function value log sin kωt of the modulating wave is read from the sinusoid table 51 in a logarithmic form. This output of sinusoid table 51 is applied to a register 52.

The output of the register 52 is applied to an adder 53. The adder 53 receives, at its another input, an output of a selector 54. The selector 54 receives, at its input (A), data representing the modulating index I and, at its input (B), envelope shape data E provided by the channel timing speed high/low converter 29 (FIG. 5). It is assumed that both data I and E are expressed in logarithm, i.e., log I and log E. The selector 54 also receives, at its control input, a select signal Sb which, as shon in FIG. 9, rises to "1" at the high speed channel timing 2. The selector 54 selects the modulation index I (i.e., log I) at the input (A) when this select signal Sb is "1", and the envelope data E (i.e., log E) when the select signal Sb is "0". The adder 53 substantially carries out linear multiplication by addition of the logarithmic values and provides its output to a logarithm/linear converter 55. The output of the logarithm/linear converter 55 is applied to the register 50. The register 50 receives, at its load control input, a load pulse Lb which, as shown in FIG. 9, rises to "1" respectively at the end of the high speed channel timings 2 and 4. The register 50 performs the loading of the output of the logarithm/linear converter 55 when this load pulse Lb has risen to "1".

When the load pulse Lb has risen to "1" at the end of the high speed channel timing 2, the sinusoidal function value (log sin kωt) of the modulating wave having been loaded in the register 52 at the end of the high speed channel timing 1 is being outputted from the register 52 and the modulation index I is being selected in the input (A) of the selector 54 in response to the select signal Sb. Accordingly, the adder 53 carries out the calculation $$\text{Log } I + \log \sin k\omega t = \log (\sin k\omega t) \quad (2)$$

and the logarithm/linear converter 55 outputs data (I sin kωt) which is data obtained by converting the output log (I sin kωt) of the adder 53. Accordingly, product (I sin kωt) of the modulating wave and the modulation index is loaded in the register 50 at the end of the high speed channel timing 2 as shown in (Rb) in FIG. 9.

Upon turning of the gate signal G1 at the high speed channel timing 3, the modulating data (I sin kωt) stored in the register 50 is applied to the adder 48 through the gate 49. The select signal in the selector 47 at this time is "0" so that the phase angle data t in the input (B) is selected. Accordingly, the adder 48 carries out calculation $$\omega t + I \sin k\omega t \quad (3)$$

A sinusoidal function value is read from the sinusoid table 51 with the sum expected by the equation (3) being taken as the phase angle data. The sinusoidal function value is a frequency modulating signal log sin (ωt + I sin kωt) in a logarithmic form. This signal is loaded in the register 52 when the load pulse La has risen to "1" at the end of the high speed channel timing 3.

At the high speed channel timing 4, the select signal Sb in the selector 54 has already been turned to "0" and the envelope waveform data (log E) in the input (B) has therefore been selected so that this data (log E) and the frequency modulating signal log sin (ωt + I sin kωt) are added together by the adder 53. As a result, the adder 53 outputs a logarithmic expression log E sin (ωt + I sin kωt) of the product of the frequency modulating signal and the envelope shape data. This product is converted to a linear expression by the logarithm/linear converter 55 and thereafter is loaded in the register 50 when the load pulse Lb has risen to "1" at the end of the high speed channel timing 4. As shown in (Rb) in FIG. 9, the register 50 outputs the tone waveform amplitude data e(t) + E sin (ωt + I sin kωt) of one channel during a period of time from the high speed channel timing 5 to the high speed channel timing 2 in a next high speed cycle. This output of the register 50 is applied to a register 56 of a channel timing speed low/high converter 30 (FIG. 5) as the output of the tone producing section 27.

The channel timing speed low/high converter 30 is a circuit for converting the channel timing of the tone waveform amplitude data (*waveshape samples*) for the respective channels outputted on a time shared basis *on a timeshared basis* from the tone producing section 27. The register 56 receives, at its load control input, a load pulse L3 which, as shown in FIG. 7, rises to "1" at the end of the high speed channel timing 8. The register 56 receives the tone waveform amplitude data outputted from the tone producing section 27 (register 50 in FIG. 8) when the load pulse L3 has risen to "1". There is a delay of about 6 time slots of the high speed channel timing between the low speed channel timing on the input side of the tone producing section 27 (refer to (R2) in FIG. 7 and (ωt) in FIG. 9) and the channel timing on the output side thereof (refer to (Rb) in FIG. 9). Accordingly, by loading the tone waveform amplitude data of the respective channels in the register 56 at the end of the high speed channel timing 8 in response to the load pulse L3, the channel of the data outputted from this register 56 becomes (R3) shown in FIG. 7. In (R3) in FIG. 7, interval of one low speed channel timing corresponds to one cycle of the high speed channel timing.

The output of the register 56 is applied to an input (A) of a selector 57. The output of the selector 57 is applied to an 8-stage shift register 58 which is shift controlled in synchronism with the high speed channel timing in response to the system clock pulse $\phi_0$. The output of the shift register 58 is fed back to another input (B) of the selector 57. The select signal S2 of the selector 57 is a signal which, as shown in FIG. 7, rises to "1" in the respective low speed channel timings shown in (R3) in accordance with one high speed channel timing which is of the same number as the low speed channel timing. For example, when the tone waveform amplitude data of the low speed channel timing 8 is outputted from the register 56, the select signal S2 is turned to "1" in accordance with the high speed channel timing 8 whereas when the tone waveform amplitude data of the low speed channel timing 1 is outputted, the select signal S2 is turned to "1" in accordance with the high speed channel timing 1. The selector 57 selects the output of the register 56 applied to the input (A) when the select signal S2 is "1" and selects the output of the shift register 58 applied to the input (B) when the select signal S2 is "0".

Accordingly, the tone waveform amplitude data of respective channels outputted on a time shared basis from the register 56 in response to the low speed channel timing ((R3) in FIG. 7) are loaded in the shift register 58 through the input (A) of the selector 57 at corresponding high speed channel timings. The tone waveform amplitude data (*i.e., "amplitude samples"*) of the respective channels loaded in the shift register 58 are circulatingly held through the input (B) of the selector 57. In the above described manner, the tone waveform data of the respective channels are outputted on a time shared basis from the register 58 in accordance with the high speed channel timings, *i.e., at a time division rate which is not synchronous with the pitches of tones to be generated.* The output of the shift register 58 is applied to an input (A) of a selector 59.

The output of the selector 59 is applied to an 8-stage shift register 60 which is shift controlled by the system clock pulse $\phi_0$ and the output of this shift register 60 in turn is applied to another input (B) of the selector 59. The selector receives, at its control input, the carry out signal CA1 from the tone accumulator 32A. When this carry out signal CA1 is "1", the output of the shift register 58 applied to the input (A) of the selector 59 is selected and loaded in the shift register 60, whereas when the carry out signal CA1 is "0", the output of the shift register 60 is circulatingly held through the input (B) of the selector 59.

The selector 59 and the shift register 60 are provided for synchronising timing of the change of the tone waveform amplitude data provided by the tone producing section 27 by the low speed processing with the timing of the carry out signal CA1. The channel timing low/high converter 30 only converts the time division channel timing from a low speed one to a high speed one and does not control the timing of change of the waveform amplitude data. On the other hand, timing of change of the tone waveform amplitude data by the low speed converting process from the channel timing speed high/low converter 28 to the tone producing section 27 is shifted from the timing of change of the phase angle data qF*. For compensating for this shifting, the tone waveform amplitude data outputted from the shift register 58 is sampled by the carry out signal CA1 and stored in the shift register 60. The carry out signal CA1 is produced in synchronism with the timing of change of the phase ange data qF* of the respective channels (See FIG. 6). *That is, the signal CA1 is synchronous with the pitch of the tone to be generated in the respective channel.* By resampling the tone waveform amplitude data in accordance with the carry out signal CA1 harmonized with the sampling frequency in the above described manner, the tone frequencies of the tone waveform amplitude data of the respective channels outputted on a time shared basis from the shift register 60 can be accurately harmonized with the sampling frequency. *In this manner, pitch synchronous tone generation is achieved.* The output of the shift register 60 is applied to an accumulator 23 where the tone waveform amplitude data of all channels for one sample period are summed up. The sum is stored in a register 24 during one sample period, and thereafter is converted to an analog signal by a digital-to-analog converter 25 and supplied to a sound system for sounding of the tone.

The channel timing speed high/low converters 28 and 29 may be composed of only the registers 42 and 45. In that case the timing of generation of the load pulse L2 is made different from the one shown in FIG. 7, more specifically, an arrangement is made so that the load pulse L2 which rises at the end of the high speed channel timing 6 in the respective high speed cycles CY1, CY2, . . . (i.e., generated with a period of 8 times slots) in FIG. 7 will be generated with a period of 9 time slots. By so doing, the phase angle data qF* can be sampled with the channel being shifted one by one, like 1, 2, 3, 4, . . . every 9 time slots so that data of the respective channels can be time divided at a low speed channel timing having an interval of 9 time slots. In that case, however, the interval of the low speed channel timing is not in agreement with one cycle (8 time slots) of the high speed channel timing and, accordingly, the interval structure of the tone producing section 27 or the construction of the channel timing speed low/high converter 30 is made more complicated.

I claim:

1. An electronic musical instrument comprising:

a phase angle data generator for generating a phase angle data signal which exhibits a value timewisely progressing, at every predetermined sampling timing of a constant interval, from a first value to a second value at an incremental step value per timing interval corresponding to the frequency of a tone intended to be sounded;

a reset circuit connected to said phase angle data generator for resetting the progressing value of said phase angle data signal to said first value at each sampling timing that said data reaches said second value; and a tone generator connected to said phase angle data generator for generating a tone signal based on the progressing value of said phase angle data signal.

2. An electronic musical instrument as defined in claim 1 wherein:

said phase angle data generator comprises an accumulator having a modulo of a value equal to said second value which repeatedly adds or subtracts, at a calculation timing of a constant interval, a constant corresponding to the frequency of the tone intended to be sounded; and said reset circuit resets to said first value, at each timing at which a carry out signal is produced by said accumulator, a progressing value which has caused said accumulator to produce the carry out signal.

3. An electronic musical instrument as defined in claim 2 wherein said constant includes a first constant representing a note within one octave and a second constant representing an octave among plural octaves;

said accumulator includes a first accumulator having a modulo of a third value which repeatedly adds or subtracts said first constant at a predetermined calculation timing and a second accumulator having a modulo of a value equal to said second value which repeatedly adds or subtracts said second constant each time a first carry out signal is produced by said first accumulator; and said reset circuit resets, upon production of a second carry out signal by said second accumulator, respective progressing values which have caused said first and second accumulators to produce said first and second carryt out signals.

4. An electronic musical instrument as defined in claim 1 which further comprises note selection means for selecting a note from among a plurality of notes and a key assigner for assigning the note selected by said note selection means to one of a plurality of tone generation channels; and wherein said phase angle data generator generates, on a time shared basis, the phase angle data signal progressing at a rate corresponding to the frequency of said note having been assigned to said channel at every sampling timing of a constant interval arriving on a time shared basis for each of the tone generation channels;

said reset circuit resets, upon reaching of the phase angle data signal to said second value at a sampling timing of a certain channel, only the progressing value of the phase angle data signal corresponding to this channel in said phase angle data generator; and said tone generator produces tone signals in a plurality of channels in response to the phase angle data signal provided on a time shared basis by said phase angle data generator.

5. An electronic musical instrument comprising:

a phase angle data generator for generating a phase angle data signal which exhibits a value timewisely progressing, at every predetermined sampling timing of a constant interval, from a first value to a second value at a rate corresponding to the frequency of a tone intended to be sounded;

a reset circuit connected to said phase angle data generator for resetting the progressing value of said phase angle data signal to said first value at every sampling timing when said data reaches said second value;

first memory means for temporarily storing the phase angle data signal produced by said phase angle data generator after sampling it at a low speed timing;

a tone generator for generating tone waveform amplitude data based on the progressing value of said phase angle data signal stored in said first memory means;

second memory means for temporarily storing the tone waveform amplitude data generated by said tone generator after sampling it at a high speed timing; and third memory means for storing said tone waveform amplitude data of said second memory means at every sampling timing at which the phase angle data in said phase angle data generator exhibits a predetermined third value;

the output of said third memory means being used as a tone signal.

6. An electronic musical instrument as defined in claim 5 wherein said phase angle data generator comprises a first accumulator having a modulo of a third value which repeatedly adds or subtracts a first constant corresponding to a note of the tone to be sounded within one octave and a second accumulator which adds or subtracts a second constant corresponding to the octave of the tone to be sounded each time a first carry out signal is produced by said first accumulator;

said reset circuit resets, upon production of a second carry out signal by said second accumulator, respective progressing values which have caused said first and second accumulators to produce said first and second carry out signals; and said third memory means having said tone waveform amplitude data of said second memory means loaded therein each time said first carry out signal is produced by said first accumulator.

7. An electronic musical instrument comprising:

a keyboard;

a depressed key detector;

key assigner means for generating, in time division order, codes identifying depressed keys;

frequency number table means for generating, in like time division order, frequency numbers corresponding to depressed key identified by said codes;

operating means for generating, in like time division order, phase data of waveshapes on the basis of said frequency numbers;

channel timing speed high/low converter means for sampling said phase data at a timing which is slower than the timing of said time division order, thereby converting said phase data to a relatively lower sampling speed;

tone production means for generating a waveshape in response to said phase data sampled at said lower speed;

first and second shift registers each having a number of stages equal to the maximum number of tones to be sounded simultaneously and shifted at a relatively higher speed corresponding to said time division order;

channel timing speed low/high converter means for loading the generated waveshape into a corresponding channel of said first shift register;

selector means for selectively inputting to said second shift register either the output of said low/high converter means or the output of said second shift register respectively in accordance with a select signal provided by said operating means and representing a change of waveshape phase data in a corresponding time division channel; and a sound system for producing a sound in response to the output of said second shift register.

8. An electronic musical instrument in which waveshape sample point amplitudes of a tone to be sounded are produced at certain regular time intervals, aliasing noise being eliminated in said instrument by harmonizing the frequency of said tone with the waveshape sampling frequency, comprising:

phase angle data means for providing a repetitive phase angle data signal which exhibits a timewisely progressing value increasing stepwise at a certain relatively high speed timing clock rate, with an incremental step value corresponding to the frequency of said tone to be sounded, said signal being repetitively reset to a fixed value when a second value is reached, said resetting being synchronized with said high speed timing clock, a tone production section for producing said sample point amplitudes but operating at a sampling frequency which is submultiple of said high speed timing clock rate, a first channel timing speed converter at the input of said tone production section for sampling said phase angle data signal at said sampling frequency, the sampled values being input to said tone production section and utilized therein for the production of said sample point amplitudes, and a second channel timing speed converter at the output of said tone production section for repetitively supplying the produced sample point amplitudes from said tone production section at said high speed timing clock rate, and means for producing said sounded tone from the sample point amplitudes supplied from said second converter.

9. An electronic musical instrument according to claim 8 further comprising:

synchronizing means, cooperating with said second converter, for causing a newly changed value of sample point amplitude from said tone production section to be supplied to said means for producing.

*10. In a time division multiplex polyphonic musical tone generation system for generating tones wherein waveshape samples corresponding to a tone are produced in time division order with respect to waveshape samples of other tones including non-harmonically related tones and each tone to be generated is assigned to a different time division multiplex time slot, the improvement for pitch synchronous tone generation comprising:*

*storage means for storing and outputting, in time division order, waveshape samples corresponding to said tones assigned to the respective time slots; and*

*sampling means for sampling, at respective rates which are synchronous with the respective pitches of said selected tones assigned to the respective time slots, said waveshape samples outputted from said storage means at the respective time slots in said time division order.*

*11. The improvement as defined in claim 10 wherein said system has tone generation means for generating, in time division order according to a first rate, said waveshape samples corresponding to said tones assigned to the respective time slots, and wherein said storage means comprises:*

*selection means for selecting said waveshape samples generated from said tone generation means in response to a predetermined timing clock signal; and*

*shift register means for circulatingly storing the selected waveshape samples in time division order according to a second rate.*

*12. The improvement as defined in claim 10 which further comprises:*

*second storage means for storing, in time division order, said waveshape samples sampled by said sampling means.*

*13. An electronic musical instrument comprising:*

*tone generating means for generating waveshape samples corresponding to tones in time division order with respect to waveshape samples of other tones including non-harmonically related tones and according to a first time division rate which is not synchronous with pitches of various tones to be generated, wherein each tone is assigned to a different tone generation channel;*

*pitch synchronous signal generation means for generating, in time division order according to a second time division rate and for each of the channels, a pitch synchronous signal which is synchronous with the pitch of the tone assigned to a corresponding one of the channels;*

*time division rate conversion means for converting the time division rate of the waveshape samples generated from said tone generation means from said first rate to said second rate; and*

*pitch synchronizing means for sampling, in time division order, the waveshape samples for each of the channels which have been converted to said second time division rate in accordance with the pitch synchronous signal corresponding to the channel thereby to provide, in time division order and for each of the channel, waveshape samples changing in synchronism with the pitch.*

*14. In a time division multiplex polyphonic musical tone generation system, wherein selected tones to be generated are assigned to different time division multiplex tone generation channels and tone waveform amplitude data for a tone is generated in time division order with respect to other tones including non-harmonically related tones, the improvement for harmonizing each change in tone waveform amplitude data with the phase of the corresponding generated tone, comprising:*

*storage means for storing and outputting, in time division order, tone waveform amplitude data corresponding to said tones assigned to the respective tone generation channels, and*

*sampling means for separately sampling, at respective rates which are synchronous with the phases of the respective pitches of said tones assigned to the respective tone generation channels, said tone waveform amplitude data outputted from said storage means at the respective tone generation channels in said time division order.*

*15. In an electronic musical instrument for generating tones and having plural time division multiplex tone generation channels and in which the tone waveform amplitude data of the respective plural tones are assigned to respective tone generation channels which are time division multiplexed with respect to each other, the improvement for synchronizing the change in the tone waveform amplitude data with the pitch of each respective tone while maintaining said data in the time division multiplex state, comprising:*

*first means for providing said tone waveform amplitude data including data for non-harmonically related tones respectively in the respective time division multiplexed tone generation channels,* second means for storing said tone waveform amplitude data in respective time division multiplexed channels and for providing said stored data in time division multiplex order for subsequent conversion to sound, and

*sampling means for transferring individual tone waveform amplitude data from said first means to said second means in synchronism with the pitch of the respective tone assigned to the associated time division multiplex tone generation channel.*

*16. A tone signal generation device comprising:*

*note clock generation means for generating note clock pulses corresponding to note name of a tone signal to be generated;*

*tone range data generation means for generating tone range data having a value representing a tone range to which said tone signal belongs;*

*phase angle data signal generation means for generating a phase angle data signal formed by performing processing of said tone range data at the timing of generation of said note clock pulse; and*

*waveshape generation means for generating a tone waveshape in the form of amplitude sample values in response to said phase angle data signal.*

*17. A tone signal generation device as defined in claim 16, wherein said tone range data corresponds to the difference between a tone pitch of said tone signal and a predetermined reference tone pitch.*

* * * * *